March 6, 1945.    F. D. PRAGER    2,370,751
FLUID FLOW CONTROL MEANS
Filed Nov. 8, 1943    2 Sheets-Sheet 1
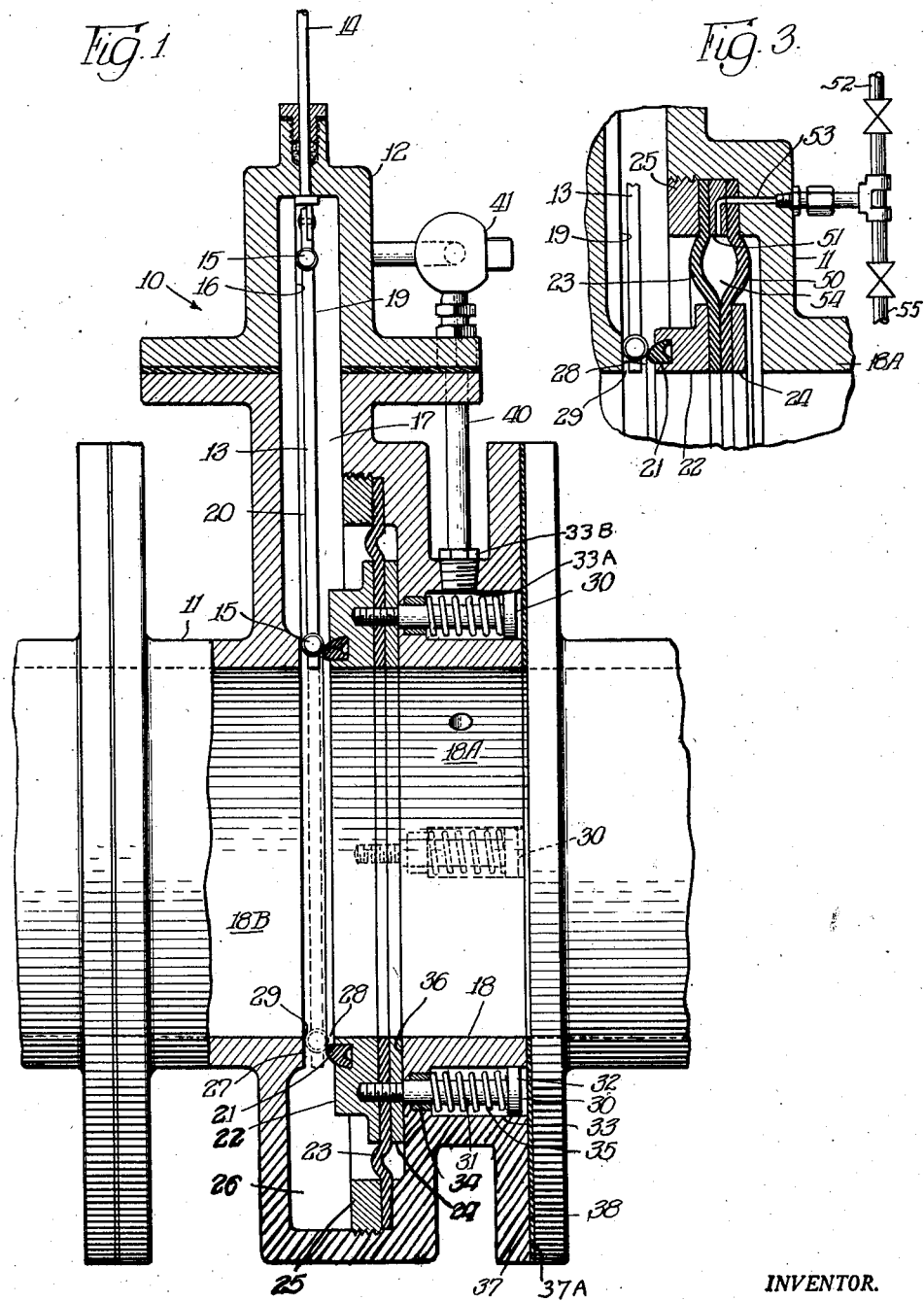
INVENTOR.
Franz D. Prager

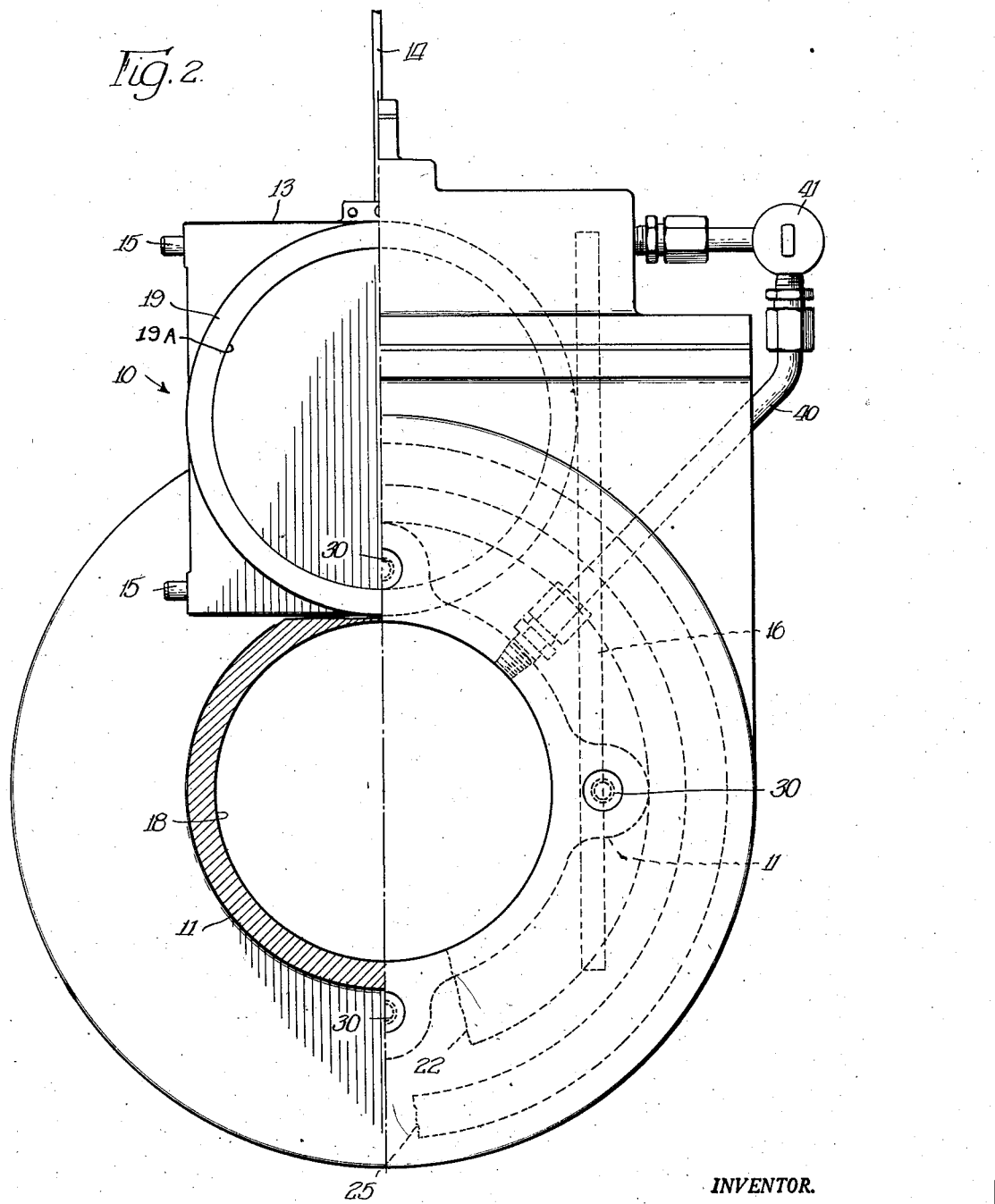

Patented Mar. 6, 1945

2,370,751

UNITED STATES PATENT OFFICE 2,370,751

FLUID FLOW CONTROL MEANS

Frank D. Prager, Chicago, Ill.

Application November 8, 1943, Serial No. 509,525

11 Claims. (Cl. 251—167)

This invention relates to fluid flow control means, such as valves, sluice gates and the like. It is an object hereof to provide a fluid flow control means which is tight-closing but opposes a minimum of resistance to the fluid flow, and which is durable, efficient, economical and small. Another object is to provide improved closure means and controls for same in valves or other flow control means. Still other objects will appear from what follows.

Controlled static fluid pressure is used in accordance herewith, to produce and maintain relative lateral expansion of a diaphragm ring seal between the gate and the seat of a gate-controlled fluid flow control means. This pressure is derived from the fluid to be controlled. The pressure to be applied is controlled in several ways, by opposing and modifying forces. This controlled pressure is applied to an annular, flexible diaphragm, and thereby transmitted to a ring-shaped pad of soft, compressible material, similar to that used in globe valves.

In some respects, my invention makes use of principles heretofore applied in diaphragm valves, that is, globe valves using a diaphragm or parts mounted directly thereon as a disc. However, the diaphragms used herein are generally annular, and differ from conventional diaphragms in other respects.

The invention will be specifically described as applied to a gate valve for water or some other non-elastic fluid, for purposes of illustration; but as mentioned before, the field of application is a much wider one.

In the drawings, Fig. 1 is a sectional side elevation of an embodiment hereof; Fig. 2 is a front elevation of the embodiment of Fig. 1; and Fig. 3 is a view similar to Fig. 1, of a modified detail.

The gate valve 10 comprises a body 11, a bonnet 12, and a gate 13. The gate is a flat disc, actuated by a rod 14, and guided by rollers 15 on tracks 16. These tracks are located on the sides of the gate chamber 17, which extends across the cylindrical bore of the valve. The bore 18 is divided into an upstream part 18—A and a downstream part 18—B by this gate chamber; the two parts 18—A and 18—B forming the main flow passage through the valve 10 when the gate 13 is raised.

The gate 13 has a flat, annular pad with a smooth, machined and hard surface 19 on the upstream side, and a similar surface 20 on the downstream side. Opposite the upstream surface 19 of the gate, I provide an annular, smooth and relatively soft pad or compression seal 21. This seal is preferably held by a metal ring 22; the metal ring being clamped to an outwardly extending, annular, flexible diaphragm ring or tension seal 23, by a second, flat metal ring or washer 24. The tension seal, in turn, is clamped to the inside of the valve body 11 by a third metal ring 25, spaced outwardly from the first and second metal rings. The free portion of the tension seal 23, between the flanges thereof which are held by said clamping metal rings, is preferably molded in form of an annular cup, as shown. It faces upstream with the concave side, and is arranged so that the inner metal rings 22 and 24, carried thereby, can be reciprocated a small distance, parallel to the axis of the cylindrical flow passage. The compression seal 21, carried by these reciprocatable metal rings, forms a seat for the annular surface 19 on the gate 13, and the said reciprocatable rings can either press this seat against the gate for tight closure, or remove it therefrom to avoid friction, adhesion, and abrasion when the gate is raised or lowered.

The several seals and rings are preferably installed in the gate chamber 17 outside of but flush with the cylindrical bore 18, as shown, so that the flow of fluid through this bore may not be obstructed or disturbed when the gate 13 is raised. For this purpose the gate chamber 17 comprises, as part thereof, an annular, outward expansion 26 of the cylindrical bore 18. The several rings are installed in said expansion 26, for instance, by threading the outermost metal ring 25 into the body 11 as shown.

The downstream surface 20 on the gate 13 is preferably in line with the upstream surface 19. Opposite this downstream surface, and in line therewith, I provide a flat, annular surface 27, which terminates the wall of the downstream bore 18—B.

When the gate 13 is lowered as shown in dotted lines in Figure 1, an annular slot or orifice 28 is formed between the upstream gate surface 19 and the compression seal 21, and another annular slot or orifice 29 is formed between the downstream gate surface and the downstream body surface, 20 and 27. Both of these annular slots are very narrow; they are desirably held within tolerances of plus and minus one-thousandth of an inch and their total width should not be more than a few thousandths of an inch. Such dimensions and tolerances are relatively simple to achieve. The gate is held in proper spacing from the downstream surface 27 by the guiding rollers 15 engaging the tracks 16. The compression seal 21 is held in proper spacing from the gate by a series of mechanisms generally illustrated at 30.

Each of said mechanisms 30 comprises a pin 31, threaded into the ring 22 and extending upstream therefrom parallel to the axis of the main valve bore 18, through the diaphragm 23, ring 24, and body 11. The upstream end of this pin 31 carries a collar or spring abutment 32, and is reciprocably received in a chamber 33 cored or drilled into the body 11. The pin 31 is held and guided by a bushing 34 in the body 11 at the point where the pin extends through the body, that is, between the chamber 33 and the expansion 26 of the gate chamber 17. A helical compression spring 35 is installed in the chamber 33, abutting against the body 11 outside of the bushing 34, unless the bushing is securely held in the body, in some suitable way. The spring also abuts on the spring abutment 32 of the pin 31, and is held in axial alignment by the pin. The spring forces the collar abutment 32, pin 31 and rings 22, 23, 24 upstream until such movement is stopped by the body 11 hitting the ring 24. For this purpose, a flat, annular surface 36 is machined on the inside of the body 11, opposite the flat ring 24. Proper control over the width of the upstream slot 28 is achieved by a proper spacing between the machined surfaces 36 and 27, inside the valve body 11.

In the preferred embodiment as shown, the chambers 33 for the mechanisms 30 are drilled into the flat end surface 37—A of an upstream flange 37 of the valve body 11, and sealed by the gasket 38 on said flange. This simplifies the construction but makes it necessary, of course, to remove the valve from the conduit in which it is installed if it becomes necessary to open these chambers 33, for inspection, service or repairs. Therefore, inspection holes 33—A and plugs 33—B for the same are desirably provided, in obvious manner, in the side walls of the chambers 33, in very large installations.

The pins 31, as shown, center the movable ring 22 with respect to the stationary parts of the valve body and the cylindrical bore 18 thereof. On the other hand, the upstream surface 19 on the gate is centered with respect to the seal ring 21, in a lowered position of the gate, by a conventional stop on the rod 14 (not shown).

The static water pressures on both sides of the seal ring 21, 22, 23 are controlled by an auxiliary conduit 40, which leads from the upstream bore 18—A to the gate chamber 17 downstream of the seal ring, and which has a manual or automatic shut-off cock 41 interposed thereon. It is important that the flow area of this auxiliary conduit must exceed the areas of the annular orifices 28 and 29, while of course, it is made smaller than the area of the main valve bore 18. Assuming that the diameter of the main valve bore 18 is twenty-four inches and the width of the orifices is one-thousandth of an inch, the area of each orifice then is .075 square inch, and the duct and shut-off cock 40, 41 which lead from the upstream bore 18—A to the gate chamber 17 between these orifices should have an area of more than .075 square inch, such as .196 square inch, which is provided by a duct and shut-off cock 40, 41 having an inner diameter of one-half of an inch. In many cases it is possible to maintain sliding fit between the gate 13 and the downstream surface 27, without any particular pressure, but so as to restrict the downstream orifice 29 to an effective width of less than one-thousandth of an inch, whereupon a smaller duct and shut-off cock 40, 41 will have the same effect as the aforementioned one of one-half inch diameter, which was mentioned in combination with an orifice of one-thousandth of an inch width; and similarly, any reduction of the upstream orifice will allow a reduction in size of the connecting duct and cock. On the other hand, if larger orifices are used, a larger duct and cock is required. The minimum size of these openings depends on a number of factors, including mainly the nature of the fluid flowing through the valve, the presence of material tending to clog small passages, and manufacturing considerations, such as desirable tolerances in machining the valve body 11, available mechanisms for actuating the cock 41 if it is automatically operated, and so on.

The operation of the valve is as follows. When the gate 13 is raised, as shown in full lines, the springs 35 hold the seal ring 21, 22, 23 at the extreme upstream position thereof, as allowed by the stop surface 36; and the cock 41 is open. The gate 13 can then be lowered, by the rod 14, without the slightest obstruction by the seal ring 21, 22, 23, since this ring is held upstream as aforesaid. Thus the compression seal 21 is safely protected from injury, regardless how often the operation is repeated; and for this reason, the compression seal hereof can be formed of suitably soft materials, such as soft rubber. When the gate 13 has reached the lowermost position the cock 41 is closed, whereby the pressure downstream of the seal ring 21, 22, 23 is diminished, the fluid being allowed to escape gradually through the annular downstream orifice 29. Thus a rising pressure differential is established across the annular upstream orifice 28. This differential works upon the whole effective area of the diaphragm 23, inside of the clamping ring 25. When this differential has reached a certain magnitude it overcomes the force of the springs 35; said springs, of course, being arranged to apply substantially uniform pressure towards the upstream side to all points of the seal ring, and being selected so that the pressure towards the upstream side overcomes the maximum differential when the cock 41 is open, but fails to overcome the minimum differential when the cock 41 is closed. As the differential overcomes the force of the springs the seal ring 21, 22, 23 is moved towards the gate 13; the movement being a gradual one since the spring force increases as the springs are compressed. Furthermore, this movement is cushioned by the dashpot effect of the chambers 33 surrounding the collars 32. Ultimately, however, the seal ring with the compression seal 21 is pressed against the face 19 on the gate, by the upstream fluid pressure acting upon the tension seal 23. Thus the closure of this gate valve is made as tight as in a globe valve with a suitable composition disc; the closure being effected and maintained by the upstream fluid pressure, without damage to the composition disc material in the process of closing the valve.

In order to open the gate valve, I first open the shut-off cock 41. This admits the upstream fluid pressure, or a relatively great part thereof, to the gate chamber 17 between the orifices 28 and 29, greatly reducing the differential force on the diaphragm 23. Thereupon, the compressed springs 35 force the seal ring away from the gate, the movement again being a gradual one due to the action of the dashpots 32, 33. When the contact between the compression seal 21 and the gate 13 has been broken, as indicated by a small flow through the valve 10, the gate is raised by the rod 14. The cock 41 remains open.

Numerous modifications can be applied. This is apparent, for instance, with respect to the seal ring controlling mechanisms 39, which in some instances can be omitted in part or altogether.

For instance, as shown in Figure 3, the metal ring 22 is held by the aforementioned diaphragm 23 and also by a similar diaphragm 50 facing upstream instead of downstream; a metal ring 51 being inserted between the outside flanges of the two diaphragms. A controllable source of pressure 52 is connected, by a conduit 53, through the valve body 11, the outer flange of the diaphragm 50, and the ring 51, to a pressure chamber 54, which is formed by and between the annular wall portions of the two diaphragms surrounded by the outside flanges. With a high fluid pressure in the chamber 54, the double diaphragm 23, 50 tends to become a relatively rigid ring with uniform tension stress in both diaphragms, and consequently, with a definite geometrical shape, wherein the distance between the face of the compression seal 21 and the clamping ring 25 is fixed and constant.

The rigidity of the diaphragm ring 23, 50, induced by the fluid pressure in the chamber 54, opposes the sealing pressure between the compression seal 21 and the upstream gate surface 19, if the distance of the clamping ring 25 from the gate surface 19 is properly selected. Preferably the diaphragm ring, when fully inflated, breaks the contact between the compression seal and the gate. Thereupon, I can raise the gate 13, and later return it to closed position. For tight closing, I deflate the diaphragm ring through a valved passage 55 connected to the conduit 53. The auxiliary cock 41 and duct 40 are not as indispensable in this embodiment as in the basic one, but of course in some cases they may be useful in this combination also.

With two diaphragms 23 and 50 of identical size and construction, the proper stress conditions for opening the seal are established if the valve is closed tight, and the plane where the inner parts of the two diaphragms are fastened together is located downstream of the plane through the center of the outer diaphragm spacing ring 51, both planes being normal to the axis of the valve bore 18. However, this relationship can be modified considerably, with different diaphragm constructions and arrangements. The essential thing is that inflation of the diaphragm ring tends to open the valve seal.

The modification of Figure 3, which substitutes the inflatable diaphragm ring instead of the diaphragm and spring combination of Figures 1 and 2, is particularly useful where the pressure of the fluid flowing through the valve 10 is subject to great variations, and where the differentials across the upstream orifice 28 may range over a wide variety of magnitudes. On the other hand the basic embodiment has the advantage that it is operable without outside pressure. Still other modifications may occur to persons skilled in the art.

I claim:

1. A tight-closing, low-resistance fluid flow control means, comprising a body, a flow passage in said body, a closure member movably associated with said body and having a first position wherein said flow passage is wide open and a second position wherein said closure member closes said flow passage except for an opening of small area substantially peripherally of said flow passage, thereby separating said flow passage into a part upstream from said peripheral opening and a part downstream therefrom, a flat surface on said closure member, on the upstream side thereof, a ring-shaped surface located opposite said flat surface when said closure member is in said second position, a flexible diaphragm ring, an inner part of said diaphragm ring being movable and having said ring-shaped surface thereon, and an outer part of said diaphragm ring being permanently peripherally clamped to the inside of said body, whereby the pressure of fluid upstream from said opening is adapted to move said inner part towards said flat surface and to close said opening, means adapted to move said inner part away from said flat surface, and means adapted to be actuated separately from said closure member to control said effect of said pressure on said inner part.

2. A tight-closing, low-resistance fluid flow control means, comprising a body, a flow passage in said body, a closure member movably associated with said body and having a first position wherein said flow passage is wide open and a second position wherein said closure member closes said flow passage except for openings of small area on each side of said closure member peripherally of said flow passage, thereby separating said flow passage into a part upstream from said closure member and a part downstream therefrom, a flat surface on said closure member, on the upstream side thereof, a seal ring installed in said body, a ring-shaped pad of relatively soft, compressible material forming part of said seal ring and located opposite said flat surface when said closure member has said second position, a flexible diaphragm ring forming part of said seal ring, an inner part of said diaphragm ring having said pad thereon, and another part of said diaphragm ring being peripherally clamped to the inside of said body, means adapted to oppose the fluid pressure on said seal ring and to bias said diaphragm and pad away from said closure member, a duct of area smaller than said flow passage but greater than said openings, bypassing said flow passage from a point upstream of said seal ring to a point between said openings, and auxiliary fluid flow control means in said duct.

3. A tight-closing, low-resistance fluid control means, comprising a body, a substantially straightlined flow passage in said body, a gate associated with said body to be movable in a plane transversely of said passage and having a first position wherein said flow passage is wide open and a second position wherein said gate closes said flow passage except for a small, annular opening adjacent the periphery of said passage, thereby separating said flow passage into a part upstream of said opening and a part downstream therefrom, a flat surface on said gate on the upstream side thereof, a seal ring installed in said body on the upstream side of said gate and having an inner part adapted to be moved a short distance along said passage, a ring shaped pad of relatively soft, compressible material forming part of said inner part of said seal ring and located opposite said flat surface when said gate is in said second position, a flexible, tension-resistant diaphragm ring forming part of said seal ring, an outer part of said diaphragm ring being clamped to the inside of said body, whereby a pressure differential exists across said diaphragm by virtue of fluid pressure upstream of said diaphragm, and holds said pad against said surface, closing said opening, and tensioning said diaphragm, and means adapted to modify said differential and to force said inner part and pad away from said flat surface on said gate.

4. A fluid flow control means as defined by claim 3, wherein said seal ring comprises an innermost rigid ring having said pad installed thereon and having an inner surface similar to that of said passage, and in line therewith.

5. A fluid flow control means as defined by claim 3, wherein said seal ring comprises an inner, rigid ring, having a series of pins installed thereon, said pins extending into said body and being adapted to guide said seal ring in a direction parallel to said passage.

6. A fluid flow control means as defined by claim 3, wherein said flexible diaphragm ring comprises two annular diaphragm walls surrounded by said outer part and defining an inflatable and deflatable pressure chamber, at least one of said diaphragm walls being adapted to reciprocate with respect to said gate when said pressure chamber is inflated and deflated, and wherein said means to force the pad away from the gate comprises means to inflate and deflate said pressure chamber.

7. A fluid flow control means as defined by claim 3, wherein said seal ring comprises an inner, rigid ring, and wherein said means to force the pad away from the gate comprises yielding pressure means adapted to work upon said inner, rigid ring.

8. A ring seal valve, comprising a body; a fluid passage through said body; a valve chamber forming an expansion of said passage; a valve member installed in said chamber and adapted in one position to substantially close said passage; a movable, annular surface, on said valve member; a fixed, annular surface, in said chamber; a diaphragm ring, having a single, annular, fixed flange and an additional, annular part; means to permanently clamp said flange of the diaphragm ring to said fixed surface, said additional part of the diaphragm ring being movable towards said valve member and away from the same; means adapted to exert an opening force on said movable part of the diaphragm ring to move it away from said valve member, the pressure of any fluid in said passage, upstream from said valve member, being adapted, in said position of the valve member, to exert a closing force on said movable part of the diaphragm ring, to move it toward said valve member and to close said passage completely; and means adapted to be actuated separately from said valve member, and to control said forces.

9. A ring-seal valve as defined by claim 8, wherein said means to exert an opening force comprises yielding pressure means annularly installed between said movable part of said diaphragm ring and said body.

10. A ring-seal valve as defined by claim 8, comprising a flange at an end of said body and passage, a flat surface on said end and flange, a chamber recessed into said end surface and body, and wherein said means to exert an opening force is installed in said recessed chamber.

11. A ring-seal valve as defined by claim 8, wherein said means to exert an opening force and to control said forces comprises an annular, inflatable and deflatable pressure chamber within said movable part of said diaphragm ring, means to inflate said pressure chamber, and means to deflate said pressure chamber, at least a part of said pressure chamber being adapted to reciprocate with respect to said valve member when inflated and deflated.

FRANK D. PRAGER.